Feb. 21, 1967   L. R. SMITH   3,305,786
RATE OF CHANGE THRESHOLD DETECTOR
Filed Feb. 18, 1963
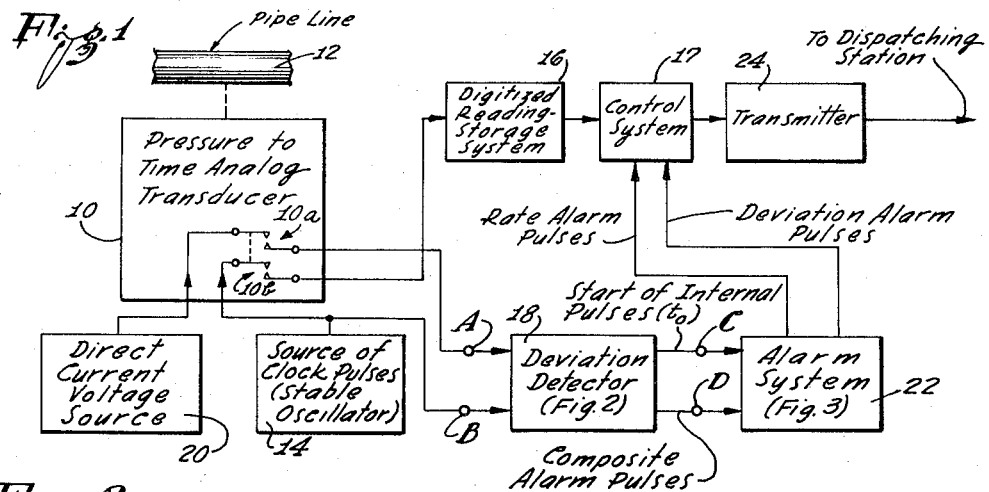
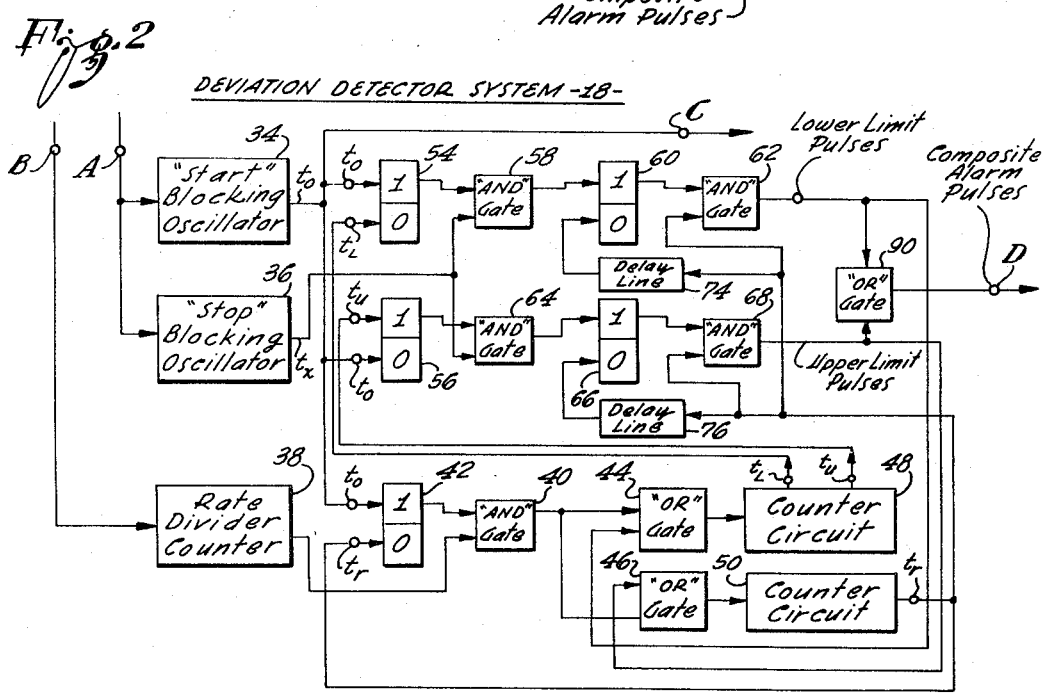
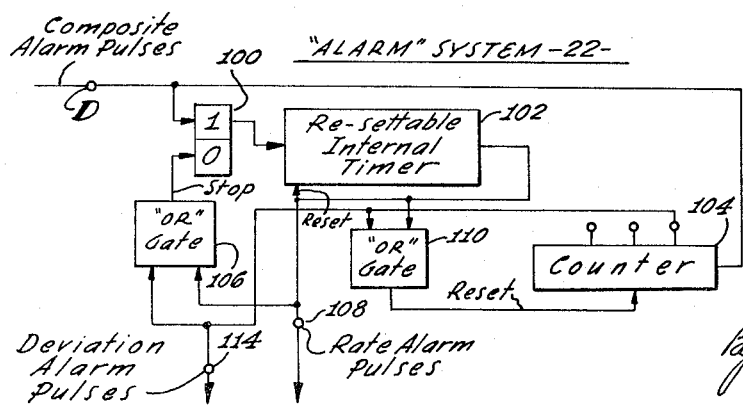
INVENTOR:
Lawrence R. Smith
Attorney United States Patent Office 3,305,786
Patented Feb. 21, 1967

3,305,786
RATE OF CHANGE THRESHOLD DETECTOR
Lawrence R. Smith, Phoenix, Ariz., assignor to Motorola, Inc., Chicago, Ill., a corporation of Illinois
Filed Feb. 18, 1963, Ser. No. 258,992
13 Claims. (Cl. 328—129)

The present invention relates to an improved deviation detector system for detecting changes in analog quantities and the rate at which such changes occur, and it relates more particularly to an improved digital system of the deviation detector type in which digital indications are produced only when the changes in the analog quantities exceed a predetermined amount.

The system of the invention finds particular utility in systems for monitoring pressures in pipelines, velocities of rotating machinery, and other analog quantities, in which information concerning the monitored analog quantity is transmitted to a remote point.

The system of the invention utilizes digital techniques for monitoring the analog quantities so that variations in the analog quantities may be instantaneously noted to up-date the local or remote display apparatus. In addition, the system may incorporate an alarm for instantaneously indicating when the variations in the analog exceeds certain safe limits.

An important feature of the system of the invention is that although changes in the monitored analog quantity are detected instantaneously, digital indications of such changes are not transmitted to the display and alarm apparatus until certain preestablished limits are exceeded.

Therefore, so long as a pressure, for example, remains within a particular range, the system remains passive and no use is made of the communication channel to the display and alarm apparatus. However, should the pressure step up or down outside the limits of the range, a pulse indication is transmitted to up-date the display and a new range is established. No further use is made of the communication channel until the pressure (or other analog quantity being monitored) steps outside the new range. Then another pulse is transmitted to the display to up-date the display.

An alarm system may also be incorporated into the over-all system, and the alarm is actuated when the number of pulses so transmitted to the display exceeds a predetermined number in unit time. This indicates, for example, that predetermined safe limits have been exceeded by the monitored quantity.

In the system of the invention, the analog quantity is repeatedly sampled and read. The previous reading of the analog quantity is stored in the system, and the present reading is compared in each instance with the previous reading. Only when the readings differ by more than a preset amount is a digital deviation output signal developed.

The invention finds particular utility, as mentioned above, in telemetry systems for up-dating remote displays and for initiating alarms. The technique of the invention, in accordance with which digital signals concerning variations of the analog quantity being monitored are transmitted only when the quantity undergoes a change in excess of a predetermined amount, eliminates the need for fast scanning of different analog quantities to be monitored and, therefore, reduces the redundant use of the telemetry channel and greatly increases the capacity of the telemetry system for time sharing purposes.

The number of digital signals developed in unit time in the sampling of the variations in any particular analog quantity can also be recorded in the detector system of the invention to provide rate of change information concerning the analog quantity. Also, as will be described, suitable alarms may be initiated when the rate of change of any particular analog quantity exceeds preset maximums or minimums.

It is, accordingly, an object of the present invention to provide an improved digital system for detecting the deviations of a monitored analog quantity in excess of pre-established limits.

A further object of the invention is to provide such an improved deviation detector system which also may incorporate means for detecting the rate of such deviations.

Another object of the invention is to provide such an improved digital deviation detector system which requires no moving parts, and which operates efficiently despite the occurrences of long time intervals between changes of the analog quantity beyond the pre-established limits.

A more specific object of the invention is to provide an improved solid state digital deviation detector system for detecting deviations in an analog quantity in excess of pre-set maximums and minimums, which has relatively long memory capabilities.

Another object of the invention is to provide such an improved deviation detection system which is relatively simple and economical to construct, and which utilizes digital techniques to achieve its desired result in an efficient and straight-forward manner.

A feature of the invention is the provision of an improved digital deviation detector system for particular use in telemetry, and which is constructed to transmit up-dating information for an analog quantity over a telemetry channel, and which is devised so that information is transmitted in the telemetry channel only when the analog quantity exhibits deviations in excess of pre-established limits, so as to reduce the required effective scanning speed for the telemetry system, and to reduce the band width requirements of the telemetry channel.

In the embodiment of the invention to be described, the analog quantity to be measured is, for example, the pressure in a pipeline. This pressure is converted in a usual pressure-to-time analog transducer into cyclically repeated contact closures. The time during which the contacts are closed in each cycle is a measure of the pressure. It will become evident as the description proceeds that the system of the invention can be used to monitor a wide range of analog quantities, merely by the incorporation of appropriate transducers.

The deviation detector system to be described senses the time of contact closure in the transducer for each cycle, and it develops digital outputs only when these times deviate in either direction in excess of a pre-set amount.

The time of contact closure in each cycle is digitized in the deviation detector system to be described by counting the number of standard timing pulses passed through the closed contacts of the transducer in each cycle. This is the usual prior art technique for digitizing an analog quantity. However, in the deviation detector of the invention, as will be described, the count is stored in the system, and digital output signals are produced only when the count deviates beyond certain limits.

The deviation detector system to be described initiates a pulse wherever the time of contact closure for successive cycles changes by more than a predetermined amount from a previous cycle. The previous reading is then changed by a fixed increment in the direction of the deviation to provide a reference for the next reading.

As mentioned above, in the practice of the invention, signals representing the analog quantity being monitored are transmitted to the display center only at times when the quantity has changed a significant amount. In this manner, and as noted, non-redundant, efficient use is made of the telemetry channel; and the scanning speed and band width requirements are conserved.

The number of pulses developed in unit time by the deviations detector system is a measure of the rate of change of the analog quantity being monitored. The deviation detector system of the invention, therefore, can include an alarm which responds to a predetermined number of such pulses in any given time. This alarm can serve to shut down the monitored system; or to otherwise apprise the operator of an unusual condition by oral or visual means.

Other features, advantages and objects of the invention will become apparent from a consideration of the following description when taken in conjunction with the accompanying drawings, in which:

FIGURE 1 is a block diagram of a remote station system utilizing the deviation detector of the invention;

FIGURE 2 is a block diagram of a deviation detector system embodying the concepts of the invention; and FIGURE 3 is a block diagram of an alarm system which may be incorporated into the system of FIGURE 1 and which responds to output pulses from the deviation detector system.

The various components of the systems to be described are shown in block form. These components are in themselves believed to be well known to the art, and, for that reason, it is believed that a detailed circuit diagram of the individual components is unnecessary for a full understanding of the invention.

The system to be described is intended to be used, for example, at a remote station which may be unattended. This remote station may, as a particular example, be one of a series of such stations positioned along a pipeline, or other instrumentality. Each remote station of the series, in the particular example, monitors the pressure of the particular fluid in the pipeline, and each station transmits information concerning that pressure back to a central dispatching station.

Of course, the remote stations embodying the system of the invention may be used to monitor other analog quantities. The system will be described herein in conjunction with the monitoring of the pressure of a particular fluid in a pipeline by way of example only.

The system of FIGURE 1 includes a pressure-to-time analog transducer 10. This transducer may be of any well known type. The transducer 10 is coupled, for example, to a pipeline 12. The pipeline 12 is shown in fragmentary form in FIGURE 1, and it carries a particular fluid, the pressure of which is to be monitored by the system of the invention.

The pressure-to-time analog transducer 10 incorporates pairs of contacts 10a and 10b. These contacts are cyclically closed by the transducer, in a manner well understood in the art, and the time of closure of the contacts for each cycle is a measure of the monitored pressure in the pipeline 12.

The system of FIGURE 1 includes a source of clock pulses 14. This source is usually in the form of a stable crystal controlled oscillator which generates pulses of a selected repetition rate. The pulses from the source 14 pass through the contacts 10b during the period of closure of the contacts for each cycle, and they are introduced to a known type of digitized reading-storage system 16.

In accordance with the usual prior art digitizing practice; the reading-storage system 16 respondse to the pulses for each interval of closure of the contacts 10b, and it counts the pulses to provide a digitized indication of the pressure in the pipeline 12.

In accordance with prior art practice, the reading in the digitized storage system 16 is periodically sampled under the control of an appropriate control system 17, and the sampled information is transmitted to the central dispatching station by a transmitter 24.

It is evident that in the prior art type of system, if a close check is to be kept on the reading at each remote station, this sampling must proceed at a relatively high rate. Then, if a single time shared channel is to be used as is the general practice, the sampling rate for the plurality of remote stations must be accordingly increased. Also, it is usually desired that the channel between the remote stations and the central dispatching station be further utilized for transmitting controls to the remote stations. This further creates complications in the bandwidth requirements of the communicating channel.

As mentioned above, the system of the present invention is adavntageous in that the digitized reading in the storage system 16 is sampled only if a change in the reading outside established limits is indicated. This change is detected by a deviation detector 18 which is constructed in accordance with the concepts of the invention, and which is shown in block form as a particular embodiment in FIGURE 2.

The contacts 10a of the transducer 10 are connected to a direct current voltage source 20 and to an input terminal A of the deviation detector 18. The contacts 10a close in exact coincidence with the closure of the contacts 10b for each cycle, so that a pulse is applied by way of the terminal A to the deviation detector 18, the pulse having a leading edge at the beginning of each closure of the contacts 10a, 10b in each cycle, and having a trailing edge at the end of each closure of the contacts in each cycle. The output from the source of clock pulses 14 is also applied to the deviation detector 18 by way of an input terminal B.

The deviation detector 18 develops, as will be described, composite alarm pulses whenever the monitored reading of the fluid in the line 12 exceeds predetermined upper or lower limits in a selected span. These composite alarm pulses are introduced to an alarm system 22 by way of an input terminal D. The deviation detector 18 also produces a start-of-interval pulse ($t_0$) to indicate the time of closure of the contacts 10a, 10b in each cycle.

The alarm system 22 develops deviation alarm pulses each time a pulse is produced by the deviation detector 18, and these are applied to the control system 17, so that the corresponding reading in the storage system may then be transmitted to the central dispatching station by the transmitter 24.

The alarm system 22 also produces a rate alarm pulse whenever the number of deviation alarm pulses in unit time exceeds a pre-established maximum. This is an indication of an unusual state of affairs in the pressure of the fluid in the pipeline 12, which calls for a special alarm. The rate alarm pulses are also applied to the control system 17 to cause the corresponding reading in the storage system 16 to be transmitted by the transmitter 24 to the dispatching station. This latter transmission, however, is accompanied by a distinguishing signal which actuates a special alarm at the dispatching station.

Details of an improved communication system for transmitting the information in the storage system 16 to the central dispatching station may be found in copending application Serial No. 109,440, now abandoned and refiled as a continuation, Serial No. 375,411, June 8, 1964.

The transmitted information, in either instance, is used at the dispatching station to up-date the display corresponding to the particular remote system. It will be appreciated, therefore, that there is no transmission by the transmitter 24 to the central dispatching station and, therefore, no use of the communication channel so long as the digitized reading at the particular remote station remains within predetermined limits. However, should the reading exceed the predetermined limits, the latest reading is sent to the dispatching station to immediately up-date the corresponding display thereat. Therefore, a close monitoring control may be kept on the conditions at the remote station, without the concomitant requirement of exceeding the high scanning rates and wide band channels, as is the case in the prior art systems.

As mentioned above, one embodiment of the deviation detector system 18, which is constructed in accordance with the concepts of the invention, is shown in FIGURE 2. The system 18 of FIGURE 2, as mentioned above, has input terminals A and B.

The pulse applied to the input terminal A of the deviation detector system 18 (FIGURE 2) during each cycle of the transducer 10 is applied to a "start" blocking oscillator 34 and to a "stop" blocking oscillator 36. The "start" blocking oscillator 34 incorporates known circuitry which responds to the leading edge of each pulse at the input terminal A to produce a "start" output pulse $t_0$. The "stop" blocking oscillator 36 incorporates known circuitry and it responds to the trailing edge of each pulse at the input terminal A to produce a "stop" output pulse $t_x$.

The circuitry of the blocking oscillators 34 and 36 are well known to the electronic art, and a detailed description of such circuitry is deemed to be unnecessary herein. The block diagram of FIGURE 1 also includes components which, as mentioned above, are likewise, known to the electronic art. It is also believed unnecessary to include illustrative circuit diagrams for the latter components, as any appropriate known circuits may be used.

The latter components include, for example, bi-stable storage circuits. These bi-stable circuits may take the form of multi-apertured cores, or flip-flops, and they are triggered between the two bi-stable states by input signals applied to respective input terminals.

The diagram of FIGURE 2 also includes "and" gates and "or" gates. These gates are widely used in logic circuitry. The "and" gate responds to a particular binary state of all its applied input terminals to produce a particular binary state at its output. The "or" gate, on the other hand, responds to a particular binary state of any of its input signals to produce a particular output state. The diagram of FIGURE 2 also includes counter circuits which are shown in block form and which also may incorporate any known appropriate binary counting circuitry.

The pulses from the clock pulse source 14 are also applied by way of the input terminal B to a rate divider counter circuit 38. This counter circuit provides a ten to one division, for example, to the pulses, and it applies pulses at one-tenth the pulse rate to an "and" gate 40.

The output pulses $t_0$ from the start blocking oscillator 34 are applied to the set input terminal of a bi-stable storage unit 42. The set output terminal of the unit 42 is connected to the "and" gate 40. The "and" gate 40 is connected to a pair of "or" gates 44 and 46. The "or" gate 44 is connected to a counter circuit 48, and the "or" gate 46 is connected to a counter circuit 50.

Whenever the "or" gate 44 produces an output pulse, this pulse serves to initiate the count of the counter circuit 48. Likewise, whenever the "or" gate 46 produces an output pulse, that pulse serves to initiate the count of the counter 50. Both the counter circuits 48 and 50 may be assumed to provide a count of N steps.

The counter circuit 50 produces an output pulse $t_r$ after it has received N input pulses, and this output pulse is introduced back to the reset input terminal of the unit 42.

The counter circuit 48 has intermediate taps which are adjustable, and at which span designating pulses $t_L$ and $t_U$ are respectively produced. The pulses $t_L$ are connected to reset input terminal of bi-stable storage unit 54, and the pulses $t_U$ are applied to the set input terminal of a bi-stable storage unit 56. The pulses $t_0$ from the start blocking oscillator 34 are applied to the set input terminal of the unit 54 and to the reset input terminal of the unit 56.

The set output terminal of the unit 54 is connected to an "and" gate 58 which, in turn, is connected to the set input terminal of a bi-stable storage unit 60. The set output terminal of the unit 60 is connected to an "and" gate 62 which, in turn, is connected to the "or" gate 44.

The set output terminal of the unit 56 is connected to an "and" gate 64. The "and" gate 64 is connected to the set input terminal of a bi-stable storage unit 66. The unit 66 is connected to an "and" gate 68 which, in turn, is connected to the "or" gate 46.

The output pulses $t_r$ from the counter circuit 50 are introduced to the "and" gates 62 and 68, and these pulses are also passed through respective delay lines 74 and 76 to the respective reset input terminals of the units 60 and 66. The pulses $t_x$ from the stop blocking oscillator 36 are applied to the "and" gates 58 and 64.

As noted above, the "start" blocking oscillator 34 generates a pulse $t_0$ in each cycle at the start of each time interval of closure of the contacts 10a, 10b; and the "stop" blocking oscillator 36 generates a pulse $t_x$ in each cycle at the end of the time interval.

At the beginning of each of the aforementioned time intervals, the pulse $t_0$ sets the bi-stable storage unit 42 to enable the "and" gate 40. Frequency divided clock pulses from the rate divider counter 38 are passed through the "and" gate 40 and through the "or" gates 44 and 46 to step the counters 48 and 50 from one count to the next.

Both the counter circuits 48 and 50 are constructed to undergo a predetermined number of count configurations, such as N, and then to return to zero. The counter 50 develops an output pulse $t_r$ at the end of the N counting steps, and this pulse is applied back to the reset input terminal of the bi-stable storage unit 42. Therefore, at the end of N counts of the counter 50, the unit 42 is reset, to disable the "and" gate 40. Thus, for each closure of the contacts 10a, 10b, the counter 50 is stepped to its N count configuration by the frequency divided pulses from the counter 38. When the counter 50 reaches its N count configuration, it develops the output $t_r$ which terminates the count of both the counters 48 and 50.

As the counter circuit 48 is stepped by the pulses from the rate divider counter 38, an output pulse appears at its intermediate terminal $t_L$ after a pre-set number of counting steps, such as three, for example; and an output pulse appears at its intermediate output terminal $t_U$ after a pre-set number of counting steps, such as five, for example.

The time at which output pulses $t_L$ and $t_U$ respectively appear after the beginning ($t_0$) of any time interval of contact closure is a direct function of the count stored in the counter 48 prior to the occurrence of the start pulse ($t_0$). The pulses $t_L$ and $t_U$ therefore, can be considered as the lower and upper reference time limits, respectively, which are compared with the end of the time interval of contact closure as indicated by the stop pulse $t_x$.

Therefore, at the beginning of any time interval of closure of the contacts in the transducer, the pulse $t_0$ from the start blocking oscillator 34 sets the unit 42, and this initiates a count in the counter circuits 48 and 50. This count continues until N counts have been received in both counter circuits, at which time the counter circuit 50 develops the output pulse $t_r$, this output pulse being used to reset the bi-stable storage units 42 and to terminate the count of the counter circuits 48 and 50. At these time intervals, the counter circuit 50 is at its N count configuration.

The timing pulse $t_0$ from the start blocking oscillator 34 is also used to set the bi-stable unit 54 and to reset the bi-stable unit 56. Therefore, at the beginning of the time interval of contact closure of the contacts 10a, 10b, the "and" gate 58 is enabled, and the "and" gate 64 is disabled. Now, should the end of interval pulse $t_x$ occur after the lower limit pulse $t_L$ from the counter circuit 48 and before the upper limit pulse $t_U$ from that counter circuit, a normal condition is indicated in which the monitored pressure in the pipeline 12 has not deviated beyond the span limits set by the $t_L$ and $t_U$ taps on the counter 48.

For the above-mentioned normal condition, the pulse $t_x$ will be effectively bracketed by the two span pulses $t_L$ and $t_U$, so that both the "and" gates 48 and 54 will be disabled for the pulse $t_x$. For this normal condition, therefore, both the bi-stable units 60 and 66 will remain in their reset condition, and no pulse will appear at the output of the "and" gate 62, and no pulse will appear at the output of the "and" gate 68.

As long as the above normal condition exists; which, as noted, is indicative of the fact that the pressure in the pipeline 12 has not deviated beyond preset limits, each successive closure of the contacts 10a, 10b will produce successive counts of N in the counter circuits 48 and 50 and no pulses will appear at the outputs of the "and" gates 62 and 68.

However, should the pressure of the fluid in the pipeline 12 decrease below a lower limit, so that the end-of-interval pulse $t_X$ occurs before the lower limit reference pulse $t_L$; the "and" gate 58 will pass the pulse $t_X$ to set the bi-stable unit 60. The setting of the unit 60 enables the "and" gate 62, so that at the end of the counting interval, the pulse $t_r$ from the counter circuit 50 will be passed by the "and" gate 62 and will appear at the output of the "and" gate 62. Shortly thereafter, and after a delay as established by the delay line 74, the pulse $t_r$ from the counter circuit 50 will reset the bi-stable unit 60 to its original condition.

The above-mentioned pulse appearing at the output of the "or" gate 62 is applied through the "or" gate 44 to the counter circuit 48; so that for the next count, the counter circuit 48 is set one step ahead of the counter circuit 50. This will cause a compensating lower shift in both the lower and upper limit reference span pulses $t_L$ and $t_U$ on subsequent cycles.

If during the next closure of the contacts 10a, 10b, the pressure in the pipeline 12 is still such that the end-of-interval pulse $t_X$ occurs before the lower limit reference pulse $t_L$, another pulse will appear at the output of the "and" gate 62 and again the counter circuit 48 will be stepped to effectively lower the span pulses $t_L$ and $t_U$ on the next cycle. This stepping of the counter 38 will continue until the span pulses $t_L$ and $t_U$ again bracket the end-of-interval pulse $t_X$ from the blocking oscillator 36.

On the other hand, should the pressure in the pipeline 12 increase so that the end-of-interval pulse $t_X$ occurs after the upper reference span pulse $t_U$, the "and" gate 64 will pass the pulse $t_X$ so as to set the bi-stable unit 66. The setting of the unit 66 enables the "and" gate 68, so that at the end of the corresponding count by the counter 50, a pulse will appear at the output of the "and" gate 68. The latter pulse is applied through the "or" gate 46 to the counter circuit 50, and it serves to step the counter 50 one step ahead of the counter circuit 48. This, in effect, sets the lower and upper limit reference pulses $t_L$ and $t_U$ up one count, and this latter process continues upon the receipt of additional $t_X$ pulses after the upper limit pulse $t_U$, until the end-of-interval pulse $t_X$ is again bracketed by the lower limit and upper limit reference span pulses $t_L$ and $t_U$.

It is evident that the system of FIGURE 1 can be constructed so that the pressure of the fluid in the pipeline 12 may vary between any desired limits, as established by the adjustable taps $t_L$ and $t_U$ on the counter 48 before such a variation is indicated by the detector system. As mentioned above, the system of the invention is obviously not limited to monitoring pressures, but can be used in conjunction with a wide variety of analog quantities.

The alarm pulses appearing at the outputs of the "and" gates 62 and 68 are applied to an "or" gate 90. The output of the "or" gate 90 is connected to the input terminal D of the alarm system of FIGURE 3.

The alarm system 22 responds to the composite alarm pulses applied to its input terminal D to apply a deviation alarm pulse to the control system 17 whenever the pressure monitored by the transducer 10 varies outside the span limits $t_U$ and $t_L$ of the deviation detector system of FIGURE 2, and to apply a special rate alarm pulse to the control system whenever a predetermined number of such deviation pulses appear in unit time.

The alarm system 22, as shown in FIGURE 3, includes a bi-stable storage unit 100 which is coupled to a resettable interval timer 102. The alarm system 22 in FIGURE 3 also includes a counter 104. The input terminal D is connected to the start-stop gate 100 and to the counter 104. A selected output terminal of the counter is connected to an "or" gate 106. This output terminal of the counter 104 is also connected to an output terminal 108 at which the rate alarm pulses appear for application to the control system 17 in FIGURE 1.

The selected output terminal of the counter 104 is also connected to an "or" gate 110 which is connected to the reset terminal of the counter 104. The output terminal of the interval timer 102 is connected to the "or" gate 110 and to the "or" gate 106. This output terminal of the timer is also connected to an output terminal 114 at which the deviation alarm pulses appear for application to the transmitter 24 in FIGURE 1.

The various components of the system of FIGURE 3 are well known to the art, and these components are shown in block form, since a detailed explanation of the circuitry thereof is deemed to be unnecessary.

The first deviation pulse detected by the detector of FIGURE 2 is applied, by way of the input terminal D, to the set side of the bi-stable storage unit 100 which, in turn, applies power to the interval timer 102.

The first composite alarm pulse received from the deviation detector system 18 is also applied to the counter 104 so that the counter steps one step.

Now, should less than a pre-established number of alarm pulses be received on the input terminal D in any particular interval which has been set into the timer 102, the timer 102 will produce an output pulse before the counter 104 is stepped to the particular strapped terminal. When the timer 102 produces an output pulse, this output pulse is passed through the "or" gate 106 to reset the bi-stable storage unit 100 at "stop," and it is also passed through the "or" gate 110 to reset the counter 104. Also, a deviation alarm pulse is produced at the output terminal 114 to indicate the pressure in the pipeline 112 has actually deviated beyond the pre-set limits, but that the deviation is not critical.

On the other hand, should more than a predetermined number of composite alarm pulses be introduced to the input terminal D in a particular interval, the counter 104 will count to its selected output terminal before the timer 102 produces its output pulse. This latter event causes a pulse to be produced at the output terminal 108 which introduces a rate alarm pulse to the transmitter 24 to apprise the dispatching station of the occurrence of a critical condition.

The pulse at the selected output terminal of the counter 104 is also applied to the "or" gate 110 to reset the counter 104, and is applied to the "or" gate 106 to reset the bi-stable storage unit 100 which removes power from the timer 102 causing the timer to stop and reset.

The invention provides, therefore, an improved deviation detection system, which may be used to detect deviations in an analog quantity in excess of pre-established upper and lower limits. Although the particular example shown in FIGURE 1 illustrates a deviation detection system constructed in accordance with one embodiment of the invention used to detect variations in the pressure of fluid in a member; it is obvious that the improved deviation detector system may be used to detect deviations in any other analog quantities, so long as appropriate transducers are used to convert the quantity into a cyclically repeating time analog.

The deviation detector system of the invention is advantageous in that it exhibits memory capabilities which do not have a tendency to vary with time.

The system is constructed so that, as long as the monitored quantity remains within certain predetermined limits, the detector system of the invention remains in a passive state, and no signals are transmitted. This, as mentioned, provides adequate alarm capabilities without the need for excessive sampling speeds, and provides for efficient use of the communication channel. The system is constructed so that only when the analog quantity deviates beyond a particular maximum or minimum, does the improved detector system of the invention produce digital signals indicative of the variations.

While a particular embodiment of the invention has been shown and described, modifications may be made, and it is intended in the claims to cover such modifications which fall within the spirit and scope of the invention.

What is claimed is:

1. A deviation detector system for indicating deviations in the durations of cyclically repeated time intervals, said system including in combination: first circuit means for producing a pulse indicative of the end of each such time intervals; second circuit means coupled to said first circuit means for producing a lower limit pulse and an upper limit pulse during succeeding ones of said time intervals and time-spaced from one another by a predetermined amount; and control circuitry coupled to said first and second circuit means for producing an alarm pulse whenever said first mentioned pulse occurs before said lower limit pulse and whenever said first mentioned pulse occurs after said upper limit pulse.

2. A deviation detector system for indicating deviations in the duration of cyclically repeated time intervals, said system including in combination: first circuit means for producing first and second pulses respectively indicative of the beginning and end of each such time intervals; second circuit means coupled to said first circut means for producing a lower limit pulse and an upper limit pulse during succeeding ones of said time intervals and time-spaced from one another by a predetermined amount; first control circuitry coupled to said first and second circuit means for producing an alarm pulse whenever said second pulse occurs before said lower limit pulse; and second control circuitry coupled to said first and second circuit means for producing an alarm pulse whenever said second pulse occurs after said upper limit pulse.

3. The deviation detector system defined in claim 2 and which includes further control circuitry coupled to said first and second control circuitry and responsive to said alarm pulses for controlling the times of occurrence of said upper and lower limit pulses with respect to said first pulse.

4. The deviation detector system defined in claim 2 and which includes further control circuitry coupled to said first and second control circuitry and responsive to said alarm pulses for controlling the times of occurrence of said upper and lower limit pulses with respect to said first pulse and in a direction to tend to span said second pulse.

5. A detector system for indicating deviations in the durations of periodic time intervals, said system including in combination: a first counter; a second counter; first control circuitry coupled to said first and second counters for stepping said counters from count to count as initiated at the beginning of each such time interval; second control circuitry coupled to said first counter and to said first control circuitry for terminating the count of said counters after said first counter has reached a predetermined count; and third control circuitry coupled to said first and second counters for producing an additional count in one of said counters when the end of a corresponding one of said time intervals occurs before a first reference time and for producing an additional count in the other of said counters when the end of a corresponding one of said time intervals occurs after a second reference time displaced at preset time intervals from said first reference time.

6. The detector system defined in claim 5 and which includes timing circuit means controlled by said second counter for establishing said first and second reference times.

7. A detector system for indicating deviations in the duration of periodic time intervals, said system including in combination: a first counter; a second counter having first and second intermediate terminals for producing respective pulses thereat time spaced a preset amount when said second counter is stepped through predetermined counts; first control circuitry coupled to said first and second counters for stepping said counters from count to count as initiated at the beginning of each such time interval; second control circuitry coupled to said first counter and to said first control circuitry for terminating the count of said counters after said first counter has reached a predetermined count; third control circuitry coupled to said first and second counters for producing additional counts therein; and circuit means coupling said first and second intermediate terminals of said second counter to said third control circuitry to cause said control circuitry to introduce an additional count to one of said counters when the end of a corresponding one of said time intervals occurs before the pulse from said first intermediate terminal and to introduce an additional count to the other of said counters when the end of the corresponding one of said time intervals occurs after the pulse from said second intermediate terminal.

8. The deviation detector system defined in claim 7 in which said third control circuitry produces stepping pulses and introduces such stepping pulses to said counters to produce the additional counts therein; and which includes output circuit means coupled to said third control circuitry for utilizing the stepping pulses produced thereby as an indication of deviations in the duration of successive ones of the periodic time intervals.

9. A deviation detector system for indicating deviations in the durations of successive time intervals each designated by a start pulse and a stop pulse, said system including in combination: a source of reference pulses; a first counter; a second counter having first and second intermediate terminals for producing respective pulses thereat time spaced a preset amount when said second counter is stepped through predetermined intermediate counts; first control circuitry initiated by said start pulse and coupled to said source of reference pulses for introducing said reference pulses to said first and second counters to step said counters through successive counts after the occurrence of said start pulse; second control circuitry coupled to said first counter and to said first control circuitry for terminating the introduction of said reference pulse to said first and second counters after said first counter has reached a predetermined count; third control circuitry coupled to said first and second counters for producing pulses in response to applied pulses and for introducing the produced pulses to said counters to provide additional counts therein; and circuit means coupling said first and second intermediate output terminals of said second counter to said third control circuitry to cause said third control circuitry to introduce a pulse to one of said counters when said stop pulse occurs before the pulse from said first intermediate terminal and to introduce a pulse to the other of said counters when said stop pulse occurs after the pulse from said second intermediate terminal.

10. The deviation detector system defined in claim 9 and which includes output circuit means coupled to said third control circuitry for utilizing the pulses produced thereby as an indication of deviations in the duration of successive ones of said time intervals.

11. A deviation detector system for indicating deviations in successive quantities, each designated by a start pulse and a stop pulse, said system including in combination: a first counter; a second counter; first control circuitry coupled to said first and second counters for stepping said counters from count to count as initiated by said start pulse; second control circuitry coupled to said first counter and to said first control circuitry for terminating the count of said first and second counters after said first counter has reached a predetermined count; and third control circuitry coupled to said first and second counters for producing an additional count in one of said counters when said stop pulse occurs before a first reference pulse and for producing an additional count in the other of said counters when said stop pulse occurs after a second reference pulse displaced from said first reference pulse by a preset interval.

12. The deviation detector system defined in claim 11 and which includes timing circuit means controlled by one of said counters to produce said first and second reference pulses.

13. The deviation detector defined in claim 11 in which said third control circuitry produces stepping pulses and introduces such stepping pulses to said first and second counters to produce the additional count thereon; and which includes output circuit means coupled to said third control circuitry for utilizing the stepping pulses produced thereby as an indication of deviations in said quantities.

References Cited by the Examiner
UNITED STATES PATENTS

| | | | |
|---|---|---|---|
| 3,108,648 | 10/1963 | Williams | 340—206 |
| 3,116,458 | 12/1963 | Margopoulas | 328—151 |

ARTHUR GAUSS, *Primary Examiner.*

J. BUSCH, *Assistant Examiner.*